(12) United States Patent
Shi et al.

(10) Patent No.: US 9,067,319 B2
(45) Date of Patent: Jun. 30, 2015

(54) FAST GRASP CONTACT COMPUTATION FOR A SERIAL ROBOT

(75) Inventors: Jianying Shi, Oakland Township, MI (US); Brian Hargrave, Dickenson, TX (US); Myron A Diftler, Houston, TX (US)

(73) Assignees: GM Global Technology Operations LLC, Detroit, MI (US); The United States of America as represented by the Administrator of the National Aeronautics and Space Administrator, Washington, DC (US); Oceaneering Space Systems, Webster, TX (US)

( * ) Notice: Subject to any disclaimer, the term of this patent is extended or adjusted under 35 U.S.C. 154(b) by 506 days.

(21) Appl. No.: 13/207,911

(22) Filed: Aug. 11, 2011

(65) Prior Publication Data
US 2013/0041502 A1 Feb. 14, 2013

(51) Int. Cl.
| | | |
|---|---|---|
| G06F 19/00 | (2011.01) | |
| B25J 9/16 | (2006.01) | |
| B25J 15/00 | (2006.01) | |

(52) U.S. Cl.
CPC ............ *B25J 9/1612* (2013.01); *B25J 15/0009* (2013.01)

(58) Field of Classification Search
None
See application file for complete search history.

(56) References Cited

U.S. PATENT DOCUMENTS

| | | | |
|---|---|---|---|
| 4,367,891 A * | 1/1983 | Wauer et al. ................. | 294/197 |
| 4,921,293 A * | 5/1990 | Ruoff et al. ................... | 294/111 |
| 4,957,320 A * | 9/1990 | Ulrich ........................... | 294/106 |
| 4,980,626 A * | 12/1990 | Hess et al. ................ | 318/568.16 |
| 5,108,140 A * | 4/1992 | Bartholet ...................... | 294/106 |
| 5,172,951 A * | 12/1992 | Jacobsen et al. .............. | 294/104 |
| 5,501,498 A * | 3/1996 | Ulrich ........................... | 294/106 |
| 5,762,390 A * | 6/1998 | Gosselin et al. .............. | 294/106 |
| 5,967,580 A * | 10/1999 | Rosheim ....................... | 294/198 |
| 6,517,132 B2 * | 2/2003 | Matsuda et al. .............. | 294/106 |
| 6,817,641 B1 * | 11/2004 | Singleton, Jr. ................ | 294/106 |
| 7,168,748 B2 * | 1/2007 | Townsend et al. ............ | 294/106 |
| 7,289,884 B1 * | 10/2007 | Takahashi et al. ............ | 700/245 |
| 7,340,100 B2 * | 3/2008 | Higaki et al. ................. | 382/199 |
| 7,549,688 B2 * | 6/2009 | Hayakawa et al. ........... | 294/106 |
| 8,280,837 B2 * | 10/2012 | Platt et al. ....................... | 706/52 |
| 8,297,672 B2 * | 10/2012 | Kim et al. ..................... | 294/106 |
| 8,346,393 B2 * | 1/2013 | Kim et al. ..................... | 700/261 |
| 8,364,314 B2 * | 1/2013 | Abdallah et al. .............. | 700/264 |
| 8,463,434 B2 * | 6/2013 | Takahashi ..................... | 700/245 |

(Continued)

FOREIGN PATENT DOCUMENTS

| | | | | |
|---|---|---|---|---|
| DE | 102010018440 A1 | 12/2010 | | |
| JP | 2005007486 A * | 1/2005 | ............... | B25J 13/08 |
| JP | 2006026875 A | 2/2006 | | |

*Primary Examiner* — Jonathan L Sample
(74) *Attorney, Agent, or Firm* — Quinn Law Group, PLLC

(57) ABSTRACT

A system includes a controller and a serial robot having links that are interconnected by a joint, wherein the robot can grasp a three-dimensional (3D) object in response to a commanded grasp pose. The controller receives input information, including the commanded grasp pose, a first set of information describing the kinematics of the robot, and a second set of information describing the position of the object to be grasped. The controller also calculates, in a two-dimensional (2D) plane, a set of contact points between the serial robot and a surface of the 3D object needed for the serial robot to achieve the commanded grasp pose. A required joint angle is then calculated in the 2D plane between the pair of links using the set of contact points. A control action is then executed with respect to the motion of the serial robot using the required joint angle.

13 Claims, 3 Drawing Sheets

(56) References Cited

U.S. PATENT DOCUMENTS

| | | | |
|---|---|---|---|
| 8,483,882 B2* | 7/2013 | Abdallah et al. | 700/260 |
| 8,504,198 B2* | 8/2013 | Takahashi et al. | 700/245 |
| 2004/0028260 A1* | 2/2004 | Higaki et al. | 382/118 |
| 2005/0125099 A1* | 6/2005 | Mikami et al. | 700/245 |
| 2006/0012198 A1* | 1/2006 | Hager et al. | 294/106 |
| 2006/0128316 A1* | 6/2006 | Moller et al. | 455/67.15 |
| 2007/0010913 A1* | 1/2007 | Miyamoto et al. | 700/264 |
| 2007/0018470 A1* | 1/2007 | Hayakawa et al. | 294/106 |
| 2007/0219668 A1* | 9/2007 | Takahashi et al. | 700/249 |
| 2007/0236162 A1* | 10/2007 | Kawabuchi et al. | 318/568.16 |
| 2008/0077361 A1* | 3/2008 | Boyd et al. | 702/189 |
| 2008/0114491 A1* | 5/2008 | Takahashi | 700/245 |
| 2009/0069942 A1* | 3/2009 | Takahashi | 700/260 |
| 2009/0302626 A1* | 12/2009 | Dollar et al. | 294/106 |
| 2009/0306825 A1* | 12/2009 | Li et al. | 700/261 |
| 2010/0011899 A1* | 1/2010 | Kim et al. | 74/490.04 |
| 2010/0138039 A1* | 6/2010 | Moon et al. | 700/245 |
| 2010/0161130 A1* | 6/2010 | Kim et al. | 700/261 |
| 2010/0280661 A1* | 11/2010 | Abdallah et al. | 700/260 |
| 2010/0280663 A1* | 11/2010 | Abdallah et al. | 700/264 |
| 2011/0067521 A1* | 3/2011 | Linn et al. | 74/490.06 |
| 2012/0283875 A1* | 11/2012 | Klumpp et al. | 700/258 |

* cited by examiner

FAST GRASP CONTACT COMPUTATION FOR A SERIAL ROBOT

This invention was made with government support under NASA Space Act Agreement number SAA-AT-07-003. The invention described herein may be manufactured and used by or for the U.S. Government for U.S. Government (i.e., non-commercial) purposes without the payment of royalties thereon or therefor.

TECHNICAL FIELD

The present disclosure relates to the control of a serial robot that is capable of grasping a three-dimensional object.

BACKGROUND

A serial robot includes a series of links that are interconnected by one or more joints. Each joint represents at least one independent control variable, i.e., a degree of freedom. End-effectors are the particular links that are used to perform a work task, such as the grasping of a three-dimensional object. Precise control over the various end effectors used in the execution of a particular grasping maneuver can therefore help in the performance of a required task with a requisite level of dexterity.

Dexterous serial robots may be used where a direct interaction is required with devices or systems that are specifically designed for human use, for instance work tools or instruments that may be manipulated effectively only with human-like levels of dexterity. The use of a dexterous serial robot may also be preferred where direct interaction is required with human operators. Such robots may include a robotic hand having one or more serial robots in the form of one or more jointed fingers.

SUMMARY

The control system disclosed herein may be used to rapidly compute the required grasp contact information for a serial robot, e.g., a robotic finger. Conventionally, object grasp contact computation requires computation in a high-dimension configuration space, typically ten or more degrees of freedom (DOF). As a result, in actual practice a serial robot such as a robotic hand is often manually "taught" by an operator to grasp a particular 3D object. That is, the operator physically positions the joints and links of the serial robot with respect to the object to establish a specific grasping pose.

The present approach dispenses of such manual teaching of robot grasp position. Instead, the method disclosed herein includes computing, via a controller, the various contacts with the 3D object using a set of analytical equations and predetermined kinematic and object positional data. When more than one robotic finger is used in an example robotic hand, the controller can simultaneously calculate all required contact points and joint angles for each of the fingers on parallel planes of the finger. That is, if contact shifts may occur due to complex or non-uniform surface curvature of the object, the shifts can be calculated by computing contact information on multiple parallel planes of the fingers as set forth herein, and then selecting the optimal set of solutions.

The present fast grasp contact computation does not require an exhaustive search for robot grasp joint angles or use a pre-populated grasp database of known objects. In addition, the present approach will automatically incorporate robotic hand kinematic constraints in the analytical equations to find feasible grasp contacts for known objects.

In particular, a system is disclosed herein that includes a serial robot and a controller. The serial robot has a pair of links that are interconnected by a joint. The serial robot is configured to grasp a three-dimensional (3D) object in response to a commanded grasp pose. The controller is in electrical communication with the serial robot, and is configured to receive a set of input information. The input information includes the commanded grasp pose, a first set of information describing the kinematics of the serial robot, and a second set of information describing the position in 3D space of the object to be grasped by the serial robot. The controller calculates, in a two-dimensional (2D) plane, a set of contact points between the serial robot and a surface of the 3D object needed for the serial robot to achieve the commanded grasp pose. The controller also calculates a required joint angle in the 2D plane between the pair of links using the set of contact points, and executes a control action with respect to the motion of the serial robot using the required joint angle.

A method is also disclosed. The method includes receiving, via a controller, a set of input information, including a commanded grasp pose for a serial robot, a first set of information describing the kinematics of the serial robot, and a second set of information describing the position in three-dimensional (3D) space of a 3D object to be grasped by the serial robot in the commanded grasp pose. The method includes decomposing motion of the serial robot into two orthogonal motions, including a first motion in a two-dimensional (2D) plane and a second motion oriented above the 2D plane, and calculating a set of contact points between the serial robot and a surface of the 3D object in the 2D space needed for the serial robot to achieve the commanded grasp pose. The method additionally includes calculating a required joint angle between a pair of links of the serial robot using the set of contact points, and then executing a control action with respect to the motion of the serial robot using the required joint angle.

The above features and advantages and other features and advantages of the present invention are readily apparent from the following detailed description of the best modes for carrying out the invention when taken in connection with the accompanying drawings.

DESCRIPTION

Figure 1:
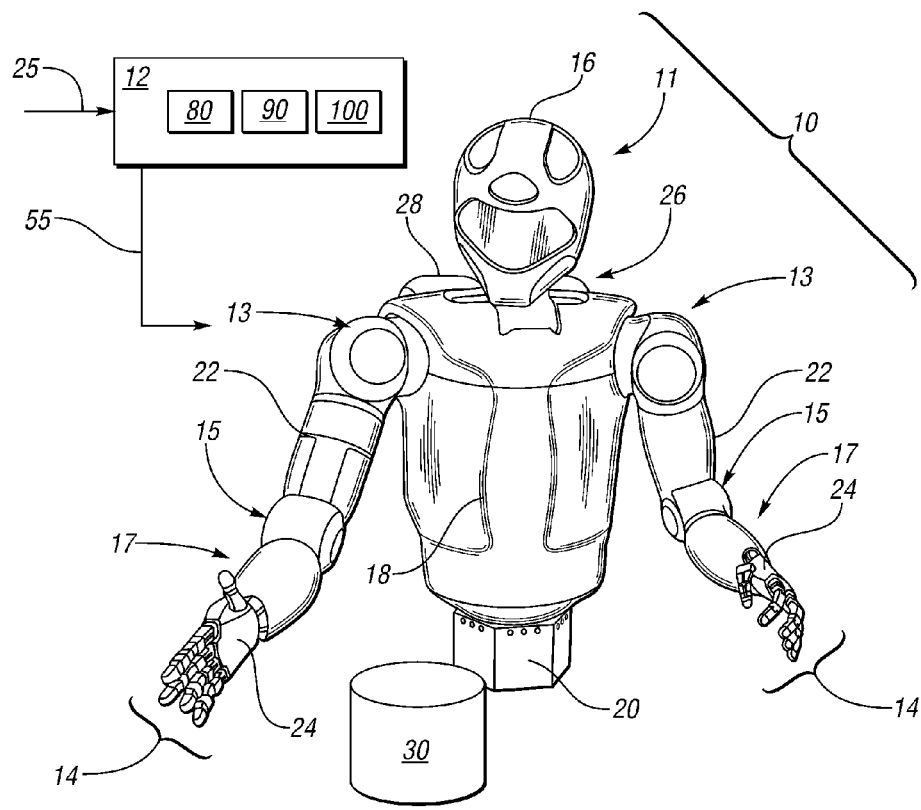
FIG. 1 is a schematic perspective view illustration of an example robotic system having serial robots in the form of robotic fingers.

With reference to the drawings, wherein like reference numbers refer to the same or similar components throughout the several views, and beginning with FIG. 1, a robotic system 10 includes a dexterous robot 11 and a controller 12. The robot 11 of FIG. 1 includes multiple robotic fingers 14. Each of the fingers 14 forms an example serial robot of the type controlled as set forth herein. Therefore, the term "finger" is used synonymously herein as an example of the term "serial robot", although one of ordinary skill in the art will recognize that other serial robot configurations are possible. Serial robots of any type include one more joints connecting a serially-arranged pair of segments or links In the example of the present finger 14, each of the linked segments can form a different phalanx of the finger 14.

The present controller 12 is configured to receive a set of input information 25. The input information 25 provides at least kinematic and positional information as explained below. The controller 12 rapidly computes a required set or sets of contact points with each finger 14. The controller 12 also derives required sets of joint angles for grasping a three-dimensional (3D) object 30 using the contact points for that particular finger 14. The controller 12 is further configured for executing a control action with respect to motion of the finger 14 using the sets of joint angles, including recording the sets of joint angles via tangible/non-transitory memory 90. Joint angles may be determined on parallel planes of each finger 14. As a result, the controller 12 may be configured to select the optimal set of joint angles for grasping the object 30.

The 3D object 30 to be grasped by the robot 11 may be, for instance, a cylindrical tool or other device having a curved surface which contacts one or more of the fingers 14 when the object 30 is grasped. The set of joint angles can be recorded by the controller 12 and thereafter used for motion control of the robot 11 to ensure that the various joints are moved as needed to establish the calculated contact points.

In one possible embodiment, the robot 11 may be configured with a generally human appearance as shown in FIG. 1, and provided with a level of dexterity necessary for completing a work task such as grasping the 3D object 30. The fingers 14 are directly controlled by the controller 12 via a set of control signals (arrow 55) when the robot 11 acts on the 3D object 30.

The robot 11 may be programmed to perform automated tasks with multiple degrees of freedom (DOF), and to control other integrated system components, e.g., any necessary clamping devices, lighting, relays, etc. According to one possible embodiment, the robot 11 may have a plurality of independently- and interdependently-moveable robotic joints, some of which have overlapping ranges of motion. In addition to the joints of the fingers 14, which separate and move the various segments or phalanges thereof, the joints of the robot 11 may include shoulders 13, elbows 15, wrists 17, a neck 26, and a waist 20 for rotating or bending a torso 18.

In one possible embodiment, the robot 11 may be formed from a single finger 14. In other embodiments, the robot 11 may include multiple fingers 14 and/or other components such as a robotic hand 24, a head 16, the torso 18, waist 20, and/or arms 22, with the various joints being disposed within or between these components. The robot 11 may also include a task-suitable fixture or base (not shown) such as legs, treads, or another moveable or fixed base depending on the particular application or intended use of the robot. A power supply 28 may be integrally mounted to the robot 11, e.g., a rechargeable battery pack carried or worn on the back of a torso 18 or another suitable energy supply, or which may be attached remotely through a tethering cable, to provide sufficient electrical energy to the various joints for movement of the same.

Still referring to FIG. 1, each robotic joint may have one or more DOF. Each robotic joint contains and is internally driven by one or more actuators, for example joint motors, linear actuators, rotary actuators, and the like, which may act on a tendon (not shown) to ultimately move and position the robot 11 with the required DOF. For example, certain compliant joints such as the shoulders 13 and the elbows 15 may have at least two DOF in the form of pitch and roll. Likewise, the neck 26 may have at least three DOF, while the waist 20 and wrists 17, respectively, may have one or more DOF. The hand 24, in an embodiment having five fingers 14, can have 15 DOF. Depending on task complexity, the robot 11 as a whole may move with over 42 DOF.

The controller 12 of FIG. 1 may be embodied as a server or a host machine, i.e., one or multiple digital computers or data processing devices, each having one or more central processing units (CPU) 80 and memory 90. An algorithm 100 may embody the particular instructions executed by the controller 12 in computing and executing the required grasp contacts as set forth herein. The server or host machine embodying the controller 12 receives the set of input information (arrow 25).

The set of input information (arrow 25) includes the required grasp pose, a first set of information describing the kinematics of the serial robot, and a second set of information describing the position in 3D space of the object 30. The controller 12 can then calculate, in a 2D plane or in multiple parallel 2D planes for each finger 14 used in a grasping maneuver, a set of contact points between the serial robot and a surface of the object 30 needed for achieving the commanded grasp pose in the input set (arrow 25). As noted above, the controller 12 can also calculate a required joint angle(s) in the 2D plane(s) between the pair of segments using the set of contact points, and can thereafter execute a control action with respect to the motion of the serial robot using the required joint angle(s).

While shown as a single device for simplicity and clarity, the various elements of the controller 12 may be distributed over as many different hardware and software components as are required to optimally control the grasping action of the robot 11. The controller 12 may include sufficient read only memory (ROM), a digital signal processor (DSP), random access memory (RAM), electrically-erasable programmable read only memory (EEPROM), a high-speed clock, analog-to-digital (A/D) circuitry, digital-to-analog (D/A) circuitry, and any required input/output (I/O) circuitry and devices, as well as signal conditioning and buffering electronics.

Figure 2:
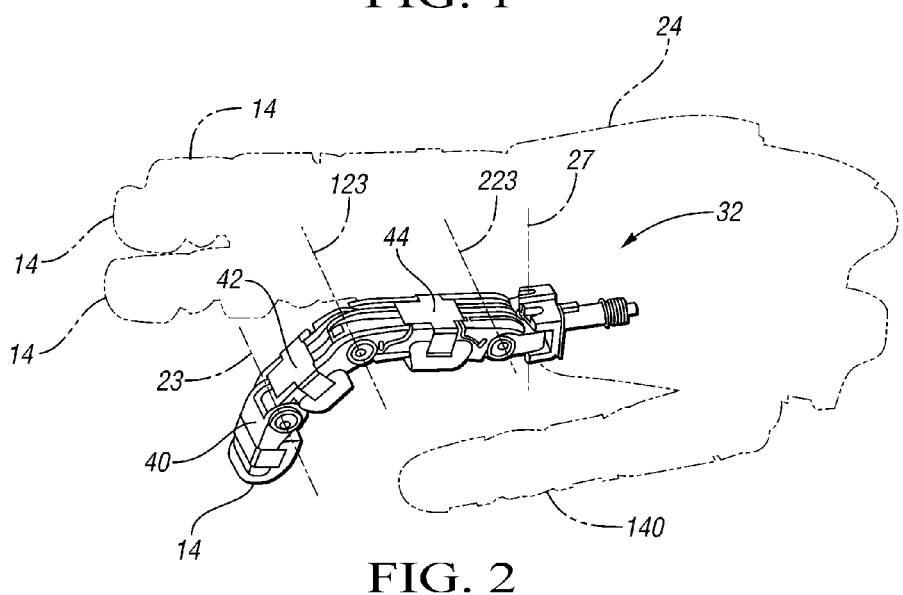
FIG. 2 is a schematic perspective view illustration of an example robotic finger having three joints and three finger segments, which may be used to grasp an object as part of a work task.

Referring to FIG. 2, an example finger 14 of a robotic hand 24 may be configured to roughly correspond to a human finger in structure and function. An opposable thumb 140 is treated herein for control purposes as a finger 14, albeit with one fewer joints. Each finger 14 may include a base 32 that is operatively connected to the hand 24. The finger 14 also includes a plurality of rigid segments or links, here shown as a distal link 40, a medial link 42, and a proximal link 44. More or fewer links may be used depending on the preferred design.

The distal link 40 is connected to the medial link 42 such that the medial link 42 is selectively rotatable with respect to the distal link 40 about a joint axis 23. The medial link 42 rotates with respect to the proximal link 44 about a joint axis 123. The proximal link 44 rotates with respect to the base 32 about a joint axis 223. Joint axes 23, 123, and 223 are parallel with respect to one another. Additionally, the proximal link 44 can move orthogonally with respect to axis 223 via a joint axis 27 to allow the proximal link 44 and any connected links to rotate in a plane, i.e., the yaw plane, at a different orientation. As used hereinafter, the common plane through which all of the links 40, 42, and 44 of a single finger 14 pass in curling the finger 14 into a desired position within what is referred to herein as the curl plane, which defines a two-dimensional (2D) plane.

Figure 3:
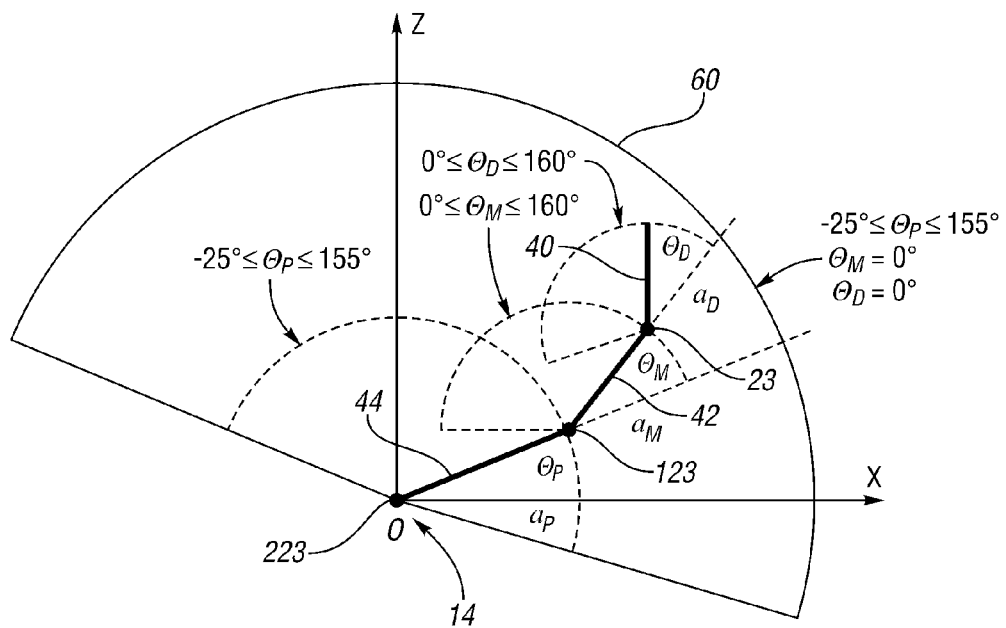
FIG. 3. is a plot on the X and Z axes (pitch and yaw), i.e., in two-dimensional (2D) space, of the motion o within a common plane of the various segments of the example finger shown in FIG. 2.

Referring to FIG. 3, a 2D curl plane 60 is used to plot the range of motion of a serial robot such as the example finger 14 of FIG. 2, i.e., a serial robot having two or more links, against the yaw axis (Z) and the pitch axis (X). The different links 40, 42, and 44 can rotate through the 2D plane 60 by rotating with respect to axes 23, 123, and 223, respectively, as shown also in FIG. 2. The variable a represents the length of the indicated link, with $a_P$ corresponding to the length of the proximal link 44 and an origin O, $a_M$ corresponding to the length of the medial link 42, and $a_D$ corresponding to the length of the distal link 40. The particular angular values and ranges of motion shown in FIG. 3 are merely illustrative of one possible embodiment, and thus are not intended to be limiting.

The ranges of motion of the various links 40, 42, and 44 can overlap with each other to some extent within the 2D curl plane 60. Respective proximal, medial, and distal joints angles ($\theta_P, \theta_H, \theta_D$) are defined with respect to its previous link as shown. The 2D curl plane 60 is thus defined via the known kinematics of the particular finger 14, modeled for instance via the set of input information (arrow 25) of FIG. 1, or another serial robot controlled in grasping the object 30 shown in the same Figure.

Figure 4:
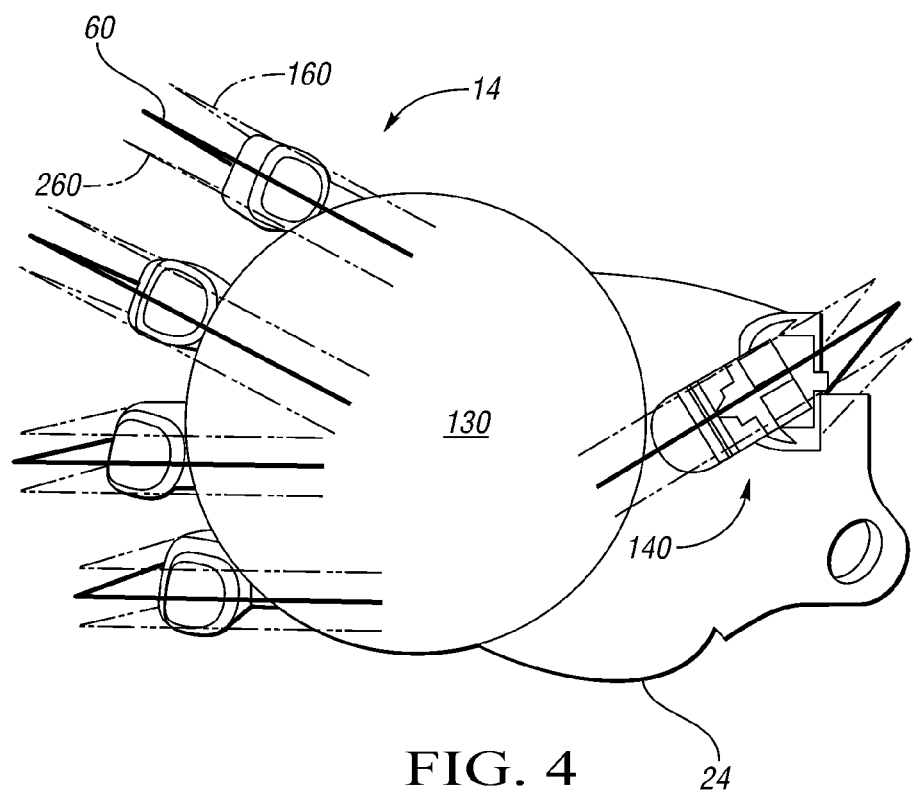
FIG. 4 is a schematic illustration of a robotic hand grasping an object having surface curvature.

Referring to FIG. 4, an example object 130 is shown being grasped by a robotic hand 24. Contact is made with the object 130 by the fingers 14 and a thumb 140, which is treated herein as another finger 14. Because each finger 14 has a corresponding width, each of the fingers 14 can be divided into multiple parallel planes. This is indicated in FIG. 4 by the parallel curl planes 60, 160, and 260. Each finger 14 is shown with similar parallel planes. The planes of a given finger 14 are parallel with respect to each other for that particular finger 14, and not necessarily with respect to the other fingers 14, as will be appreciated by those of ordinary skill in the art.

Contact with the object 130 may be made on any of the parallel planes 60, 160, 260 of a finger 14. Thus, when the curvature of the object 130 is not uniform (see FIG. 5), the various contacts may shift along the surface of the object 130 depending on the manner in which the object 130 may be optimally grasped. In other words, given an object 130 having non-uniform surface curvature, there is more than one way to grasp the object 130. Some grasps may be more optimal than others. The controller 12 of FIG. 1 can thus account for this, as noted below with reference to FIGS. 5 and 6.

Simplifying the control problem, an intersection with the object 130 and a finger 14 is a curve on the oriented 2D curl plane 60 (see FIG. 3). Thus, the control problem in an example 3DOF system, for instance a finger 14 having three joints as shown in the example finger 14 of FIG. 2, may be simply stated as finding a set of joint angles such that the finger 14 will make contact with the object 130 in a commanded grasp pose. This set of joint angles may be represented as follows:

$$\begin{bmatrix} \theta_P \\ \theta_M \\ \theta_D \end{bmatrix}$$

Once again, the subscripts P, M, and D refer to the proximal, medial, and distal joints, and θ refers to the joint angle for that particular joint.

Figure 5:
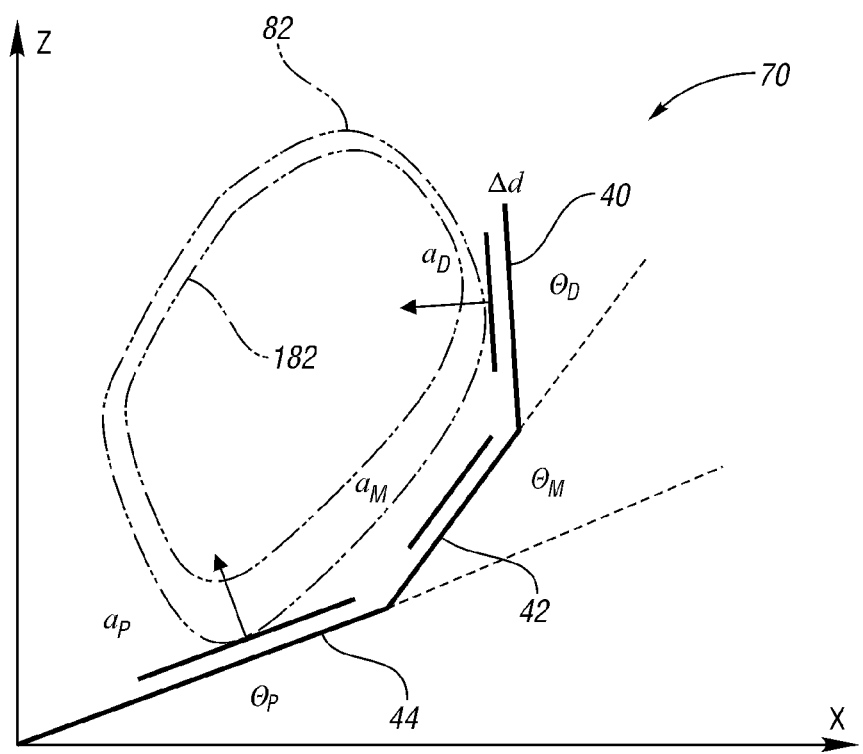
FIG. 5 is a plot on the X and Z axes (pitch and yaw), i.e., in 2D space, of computed grasp contacts with an example object of the various segments of the example finger shown in FIG. 2.

Referring to FIG. 5, the 2D object intersection curve noted above can be represented as a curve 70. The perimeter 82 represents the outer surface curvature of an object, e.g., the object 30 of FIG. 1, the object 130 of FIG. 4, or any other object grasped by a serial robot. The controller 12 shown in FIG. 1 may, for a given point $(x_i, z_i)$ on curve 70, determine its curve tangent, i.e., $\theta_i(x_i, z_i)$. The controller 12 determines that the point $(x_i, z_i)$ is a contact point with the proximal link 44 if:

$\theta_i(x_i, z_i)$ is equal to $\theta_P$;

$0 \leq x_i \leq a_P \cos \theta_P + \Delta d \sin \theta_P$; and $0 \leq z_i \leq a_P \sin \theta_P + \Delta d \cos \theta_P$.

If the contact point with the proximal link 44 and the object 30 is known from the above step, with $\Delta d$ being the finger thickness, the joint angle θp is then easily calculated by the controller 12. Thereafter, the controller 12 can proceed to solve for the medial link 42. The point $(x_i, z_i)$ is the contact point with the medial link 42 if:

$\theta_i(x_i, z_i)$ is equal to $\theta_P + \theta_M$;

$0 \leq x_i - a_P \cos \theta_P \leq a_P \cos(\theta_P + \theta_M) + \Delta d \sin(\theta_P + \theta_M)$; and $0 \leq z_i - a_P \sin \theta_P \leq a_M \sin(\theta_P + \theta_M) + \Delta d \cos(\theta_P + \theta_M)$.

If the contact point with the medial link 42 is known from the above step, the joint angle $\theta_M$ is next calculated by the controller 12. Thereafter, the controller 12 can proceed to solve for the angle of the distal joint. The point $(x_i, z_i)$ is the contact point with the distal link 40 if:

$\theta_i(x_i, z_i)$ is equal to $\theta_P + \theta_M + \theta_D$;

$0 \leq x_i - a_P \cos \theta_P - a_M \cos(\theta_P + \theta_M) \leq a_D \cos(\theta_P + \theta_M + \theta_D) + \Delta d \sin(\theta_P + \theta_M + \theta_D)$; and $0 \leq z_i - a_P \sin \theta_P - a_M \sin(\theta_P + \theta_M) \leq a_D \sin(\theta_P + \theta_D) + \Delta d \cos(\theta_P + \theta_M + \theta_D)$.

Multiple sets of the above formulas may be solved when the object 30 has complex/non-uniform curvature as indicated in FIG. 5 by the internal perimeter 182. In this case, there will be multiple object intersection curves. As shown in FIG. 4, that is, each finger 14 may be divided into multiple parallel planes. The optimal contact point with a given finger 14 may vary, as noted above, because an object 30 having non-uniform surface curvature may be grasped in any number of different ways.

Figure 6:
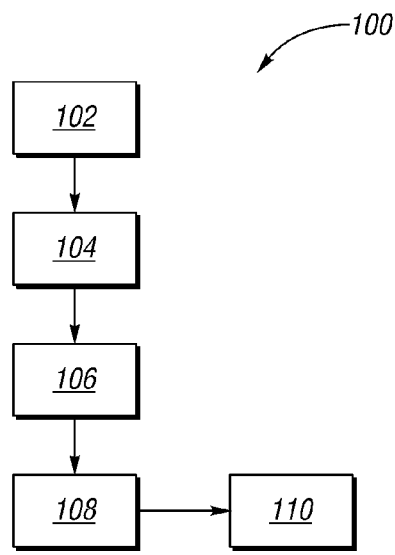
FIG. 6 is a flow chart describing an example method for computing grasp contact information for a serial robot.

Referring to FIG. 6, a flow chart is shown describing an example embodiment of the present method 100. Any processes instructions required for executing the steps described below may be stored in memory 90 (see FIG. 1) and executed by associated hardware and software components of the controller 12 to provide the desired functionality.

Starting at step 102, the controller 12 of FIG. 1 receives the commanded grasp pose and the set of input information (arrow 25). Step 102 may entail receiving a first set of information as kinematic information, for instance describing the length, range of motion, and arrangement of all of the links used in a finger 14 or other serial robot. A second set of information may include the location in 3D space of the object 30 and information describing the known surface curvature of that object 30, e.g., a contour model. The method 100 then proceeds to step 104.

At step 104, the controller 12 of FIG. 1 may simultaneously calculate the contact points and joint angles for parallel planes of each finger 14, i.e., as alternate contact points, e.g., to optimally account for the complex curvature of perimeter 182 (see FIG. 5). The controller 12 calculates sets of contact points between the finger 14 and a surface of the object 30 needed for the finger 14 to achieve the commanded grasp pose, i.e., the pose conveyed via the input information (arrow 25). This is calculated in the 2D curl plane using the possible motion in that plane as determined by the kinematics of step 102. The method 100 proceeds to step 106 after the set of contact points has been calculated and recorded in memory 90.

At step 106, the controller 12 of FIG. 1 can use the sets of contact points on the parallel planes from step 104 to calculate, for each of the 2D planes, the required joint between the pair of segments. Since the orientation of the X and Z axes of FIG. 3 is known, the controller 12 may readily determine the angle between segments given the coordinates of the calculated contact points.

At step 108, the controller 12 may determine which of these sets of joint angles is optimal relative the other sets of joint angles. The criteria for determining whether one set is optimal can be calibrated, and may include such factors as contact providing the most efficient motion relative to the next step to be performed in a work sequence, the least amount of actuation force or range of motion, the steadiest grip on the object 30, etc. Once an optimal set is determined, the method 100 proceeds to step 110.

At step 110, a control action may be executed by the controller 12 of FIG. 1 with respect to the motion of the finger 14 using the required joint angle(s) determined via execution of the prior steps. By way of example, step 110 may entail activating one or more joint motors to apply tension to one or more tendons (not shown), thus moving the finger 14 into the required position to establish the calculated contact points and joint angles. When a separate controller is used to calculate and issue the required motion commands to the finger 14, step 110 may entail recording the required passing a command to this additional controller indicating that the required contact points and joint angles have been calculated, for instance a flag or code.

While the best modes for carrying out the invention have been described in detail, those familiar with the art to which this invention relates will recognize various alternative designs and embodiments for practicing the invention within the scope of the appended claims.

The invention claimed is:

1. A system comprising:
   a serial robot having a pair of links that are interconnected by a joint, wherein the serial robot is configured to grasp a three-dimensional (3D) object in response to a commanded grasp pose; and
   a controller in electrical communication with the serial robot, wherein the controller is configured to:
      receive a set of input information, including the commanded grasp pose, a first set of information describing the kinematics of the serial robot, and a second set of information describing the position in 3D space of the object to be grasped by the serial robot;
      calculate, in a plurality of parallel two-dimensional (2D) curl planes of the links of the serial robot using the received set of input information, a set of contact points of the serial robot with a surface of the 3D object needed for the serial robot to achieve the commanded grasp pose;
      calculate a required joint angle, in each of the parallel 2D curl planes between the pair of links using the set of contact points; and
      execute a control action with respect to the motion of the serial robot using the required joint angle to thereby establish the commanded grasp pose, including selecting and commanding an optimal set of the joint angles using a calibrated criteria.

2. The system of claim 1, wherein the serial robot includes a plurality of robotic fingers each of which moves on a different set of the parallel 2D curl planes with respect to each of the other robotic fingers, and wherein the controller is configured to simultaneously calculate the set of contact points for each of the robotic fingers.

3. The system of claim 1, wherein the controller is configured to decompose the commanded grasp pose into two orthogonal motions, including a first motion in each of the parallel 2D curl planes and a second motion oriented orthogonally with respect to the respective parallel 2D curl planes.

4. The system of claim 1, wherein the serial robot includes a distal link, a medial link, and a proximal link, and wherein the controller is configured to calculate a set of three required joint angles with respect to the distal, medial, and proximal links.

5. A system comprising:
   a robotic hand having a plurality of fingers each with a plurality of links, wherein each finger is configured to moves in a different plurality of parallel 2D curl planes; and
   a controller in electrical communication with the robotic hand and each of the fingers, wherein the controller is configured for:
      receiving a set of input information, including the commanded grasp pose, a first set of information describing the kinematics of the serial robot, and a second set of information describing the position in 3D space of the object to be grasped by the serial robot;
      calculating using the received set of input information, for each of the plurality of parallel 2D curl planes for each of the fingers, a set of contact points of the links with a surface of a three-dimensional (3D) object to be grasped by the hand;
      calculating a set of joint angles for each of the fingers, for each of the parallel 2D curl planes, using a corresponding one of the sets of contact points; and
      executing a control action with respect to the motion of the fingers using the sets of joint angles to thereby establish the commanded grasp pose, including selecting and commanding an optimal set of the calculated sets of joint angles using a calibrated criteria recording the sets of joint angles via a memory device of the controller.

6. The system of claim 5, wherein the plurality of fingers includes five fingers having a total of at least 12 degrees of freedom.

7. The system of claim 5, wherein the controller is configured to decompose the commanded grasp pose into two orthogonal motions, including a first motion in the 2D plane and a second motion oriented orthogonally with respect to the 2D plane.

8. The controller of claim 5, wherein the 2D plane is a curl plane of a robotic finger.

9. The controller of claim 5, wherein the serial robot includes a distal link, a medial link, and a proximal link, and wherein the controller is configured to calculate a set of three required joint angles with respect to the distal, medial, and proximal links.

10. A method comprising:
    receiving, via a controller, a set of input information, including a commanded grasp pose for a serial robot, a first set of information describing the kinematics of the serial robot, and a second set of information describing the position in three-dimensional (3D) space of a 3D object to be grasped by the serial robot in the commanded grasp pose;
    decomposing motion of the serial robot into two orthogonal motions, including a first motion in one of a plurality of two-dimensional (2D) curl planes and a second motion oriented above the 2D curl planes;
    calculating, using the received set of input information and the decomposed motion, for the plurality of parallel 2D curl planes of the serial robot, a set of contact points of the serial robot with a surface of the 3D object needed for the serial robot to achieve the commanded grasp pose;

calculating a plurality of sets of required joint angles between a pair of links of the serial robot using the set of contact points, with one of the sets of required joint angles for each of the parallel 2D curl planes; and executing a control action with respect to the motion of the serial robot using the required joint angle, including selecting and commanding an optimal set of the calculated sets of required joint angles using a calibrated criteria, to thereby establish the commanded grasp pose.

11. The method of claim 10, the method further comprising:

calculating a set of alternative contact points on parallel planes of each finger for achieving the commanded grasp pose.

12. The method of claim 10, wherein the 2D curl plane is a curl plane of a robotic finger.

13. The method of claim 10, wherein the serial robot includes a distal link, a medial link, and a proximal link, and wherein calculating the set of joint angles includes calculating joint angles with respect to the distal, medial, and proximal links.

* * * * *